United States Patent [19]
Kulick et al.

[11] 4,148,665
[45] Apr. 10, 1979

[54] ROSIN DISPERSIONS OF IMPROVED STABILITY

[75] Inventors: Russell J. Kulick, Old Greenwich; Sewell T. Moore, Stamford, both of Conn.

[73] Assignee: American Cyanamid Company, Stamford, Conn.

[21] Appl. No.: 835,619

[22] Filed: Sep. 22, 1977

Related U.S. Application Data

[63] Continuation-in-part of Ser. No. 589,109, Jun. 23, 1975, abandoned.

[51] Int. Cl.² .............................................. C08L 93/04
[52] U.S. Cl. ...................................... 106/236; 106/238
[58] Field of Search ................... 106/236, 238; 560/151

[56] References Cited
U.S. PATENT DOCUMENTS

| | | | |
|---|---|---|---|
| 2,176,423 | 10/1939 | Jaeger | 560/151 |
| 2,368,067 | 1/1945 | Lynch | 560/151 |
| 2,438,619 | 3/1948 | Lynch | 560/151 |

*Primary Examiner*—Theodore Morris
*Attorney, Agent, or Firm*—William J. van Loo

[57] ABSTRACT

Colloidal aqueous dispersions of rosin possess improved mechanical and heat stability when they have a small dissolved content of a water-dispersible emulsifying agent selected from the group consisting of tetrasodium N-(1,2-dicarboxyethyl)-N-octadecylsulfosuccinamate, disodium N-octadecylsulfosuccinate, disodium dodecylpenta(ethoxy) ethylsulfosuccinate, and disodium decylsulfosuccinate as stabilizing agent.

5 Claims, 1 Drawing Figure

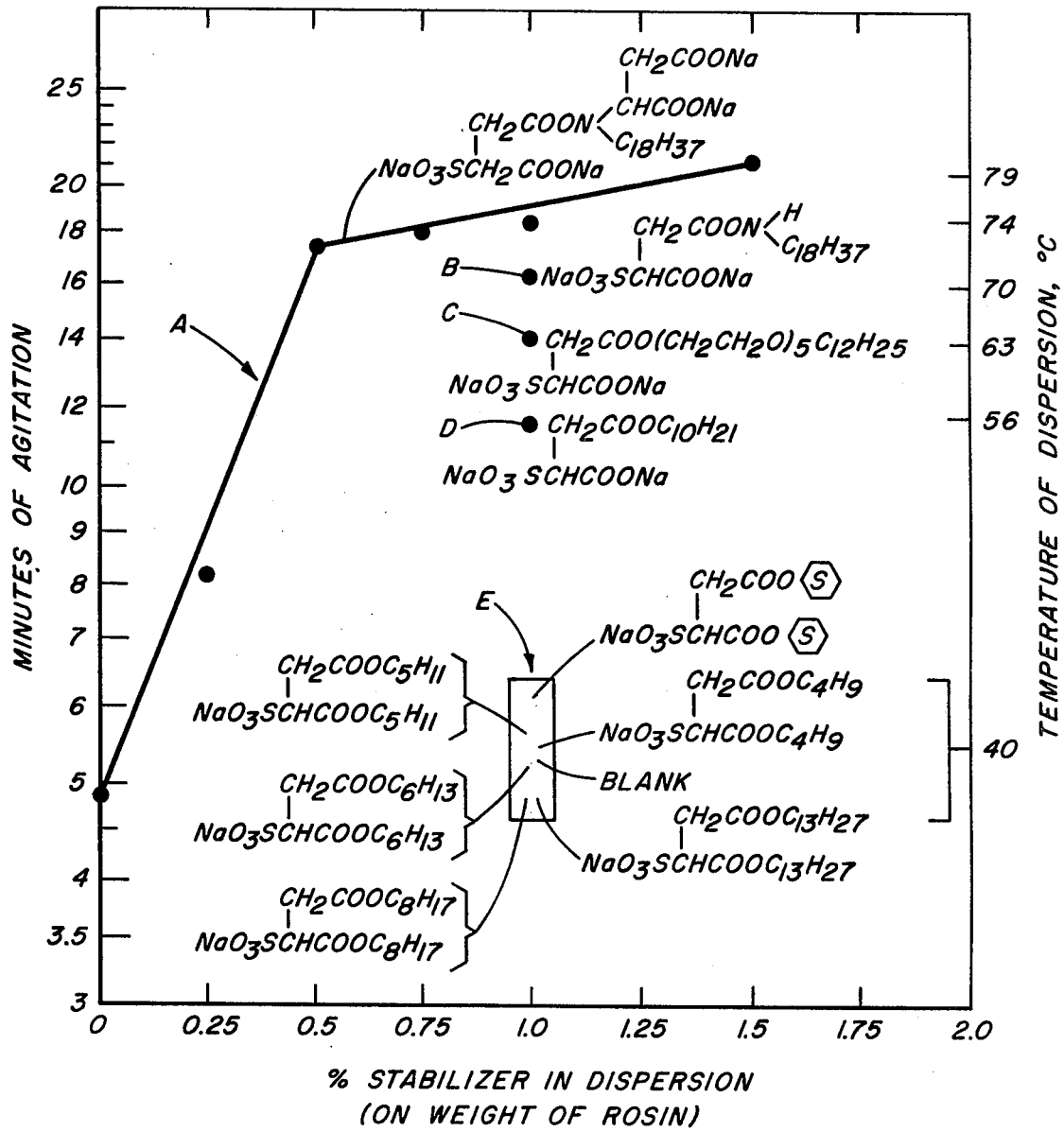

ROSIN DISPERSIONS OF IMPROVED STABILITY

CROSS-REFERENCE TO RELATED APPLICATION

This application is a continuation in part of application Ser. No. 589,109, filed June 23, 1975, now abandoned.

BACKGROUND OF THE INVENTION

1. Field of the Invention

The present invention relates to colloidal aqueous rosin dispersions of improved mechanical stability useful in the manufacture of paper. The invention includes the dispersions themselves and processes for the manufacture of the dispersions.

2. Description of the Prior Art

It has long been known that natural rosin can be emulsified in hot dilute aqueous alkali solution and that the product (a colloidal dispersion of rosin in dilute aqueous sodium rosinate solution) is an excellent sizing agent for paper. The best known agent of this type is the "Bewoid" size described in *Pulp and Paper* by James P. Casey, 2nd Ed., (Vol. 11, p. 1049 ff.).

A disadvantage of these dispersions is that they possess poor mechanical stability in that the dispersed phase aggregates and forms agglomerates when the dispersion is subjected to shear forces (as by passage through a centrifugal or gear pump). Pumps of this type are commonly used in size manufacturing plants and in paper mills, and are quickly fouled and jammed by sticky broken rosin emulsion. Moreover, coagulated rosin particles may find their way onto the paper machine causing picking, breaks, rosin spots, wire filling and other problems.

More recently it has been discovered that the sizing efficiency of rosin is increased when the rosin is reacted with a compound of acidic character containing the —CO—C=C— linkage. The product (termed "fortified rosin") has a substantially higher flow point than rosin (usually above 100° C.) and therefore usually cannot be emulsified at atmospheric pressure in the same manner as unfortified size. To avoid the use of autoclave equipment, it is therefore present-day practice to decrease the flow point of the rosin before use by mixing a volatile rosin solvent (typically toluene) into it. The toluene is later recovered from the emulsion by distillation. The process is disclosed in French Pat. No. 781,729 and in U.S. Pat. Nos. 3,565,755 and 3,817,768.

A disadvantage of this process is that the intermediate dispersion (the emulsion of the solvent-softened fortified rosin) is thermally unstable, in that it aggregates when subjected to heat. Aggregation is particularly rapid when the solvent is removed by the efficient steam distillation process.

Aggregation even occurs at room temperature when no solvent or softening agent is present.

Dispersions which have aggregated have no commercial value.

Up to the present, sodium rosinate (or sodium fortified rosinate as the case may be) has been almost exclusively used as the emulsifier for rosin (or for fortified rosin) because it is easily produced by addition of a small amount of sodium hydroxide or carbonate to the aqueous medium used for the emulsification. However, experience has shown that both sodium rosinate and sodium fortified rosinate are unsatifactory in that they do not render colloidal dispersions of rosin or fortified rosin adequately mechanically stable to withstand stringent high-shear elevated temperature conditions.

In the past, a variety of different emulsifying agents has been tried to remedy the situation, but little or no improvement has been achieved.

SUMMARY OF THE INVENTION

In accordance with the present invention, there is provided a rosin dispersion consisting essentially of colloidal particles of a paper-sizing rosin as dispersed phase in an acidic aqueous medium as continuous phase, said medium having a small but effective dissolved content of a water-dispersible hydrophobic-hydrophilic emulsifying agent selected from the group consisting of tetrasodium N-(1,2-dicarboxyethyl)-N-octadecylsulfosuccinamate, disodium N-octadecylsulfosuccinamate, disodium dodecylpenta(ethoxy)ethylsulfosuccinate, and disodium decylsulfosuccinate as agent improving the mechanical stability of said dispersion, the hydrophilic-hydrophobic balance being such that said agent is at least colloidally soluble in water, and the amount of said aqueous medium being such that the dispersion is of pumpable viscosity. When any one of the aforesaid emulsifying agents is present in the dispersion in sufficient amount, the dispersion becomes mechanically stable so that it does not "break" when it is subjected to steam distillation or when it is subjected to prolonged and intensive shear.

In preferred embodiments, the dispersions of the present invention do not aggregate when subjected to steam distillation or when circulated under normal back pressure through a pump which develops a high degree of shear. The dispersions of the present invention thus can be made efficiently from high-melting rosins, and can be pumped and stored at room or elevated temperatures under commercial conditions without aggregation.

BRIEF DESCRIPTION OF THE DRAWING

The comparative stability of a series of aqueous colloidal anionic fortified rosin dispersions of the present invention is illustrated in the drawing, in which:

The abscissa represents the percent of stabilizing emulsifier which is present in the dispersion, based on the weight of the rosin therein.

One ordinate shows the lengths of time during which the plotted dispersions remain stable when subjected to uniform high intensity shear agitation;

Line A represents a graph of the break points of a series of preferred dispersions as a function of their content of a preferred stabilizing emulsifying agent and the duration of shear agitation.

Points B, C and D represent the break points of three corresponding preferred dispersions which differ from the dispersions of line A only with respect to the stabilizing emulsifying agent therein;

Box E represents the break point area of corresponding dispersions which contain emulsifying agents outside the scope of the present invention and the control dispersion containing none of said emulsifying agent;

The temperature scale at the right hand edge of the drawing shows the temperatures of the dispersions at their break point, the rise in temperature of the dispersions from their starting temperature of about 20°–25° C. being the result of the heat developed by the agitation. For example, the temperature scale shows that the preferred dispersion containing 1.5% of the stabilizing emulsifier by weight resisted aggregation during 21 minutes of high speed agitation, during which time its temperature increased from about 20°-25° C. to 82° C., thus demonstrating that the preferred dispersions of the present invention are resistant both to high speed shear forces and to high temperature.

Line A shows that when a preferred fortified rosin dispersion contains none of the emulsifying agent of the present invention it "breaks" (i.e., coagulates) after about 4.9 minutes of agitation. Line A rises almost vertically from that point to the point where the dispersion contains 0.5% of the emulsifying agent by weight. Line A shows that at that concentration the dispersion resists aggregation for about 17.5 minutes. The line then assumes a moderate slope reflecting the fact that each added increment of emulsifier produces only a minor increase in stability.

The points in the drawing are plotted from data in Examples 1 and 2 which show how these data were obtained.

From the drawing, it appears that, in the instance given, most efficient results are obtained per unit weight of stabilizing emulsifying agent added when the amount of the dispersing agent is between about ¼% and ¾% of the weight of the rosin.

The water-dispersible hydrophobic-hydrophilic anionic emulsifying agents defined above are a known group of emulsifying agents which are characterized by at least one oleophilic group (the alkyl chain or chains), and a plurality of hydrophilic groups (the acid groups). The agents are further characterized in that of the acid groups, at least one (the carboxyl group or groups) is mildly acidic and at least one (the sulfo group or groups) is strongly acidic.

As a practical matter, we prefer the agents which are prepared by esterifying maleic or similar acid to the extent of one of its functionalities with a suitable alkanol to introduce a hydrophobic substituent and then reacting the resulting monoester with sodium bisulfite to attach a sulfo substituent. The resulting agents are not unduly costly and provide good stabilizing effect.

Among the hydrophobic substituents which are useful are decyl, dodecyl and octadecyl. We prefer substituents which contain more than 12 carbon atoms because substituents of this length provide significantly better protection on a weight basis.

Hydrophobic substituents can also be introduced by mono-amidating maleic or similar acid with a hydrophobic amine, for example, octadecylamine. Best results to date have been obtained when the amine is a secondary amine which carries carboxy groups, for example:

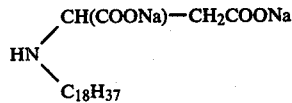

Other ways of preparing emulsifying agents suitable for the purposes of the present invention will be apparent to a skilled chemist.

There does not appear to be any criticality in the identity of the nucleus of the molecules to which the aforesaid substituents are attached, so long as the complete molecule is water-dispersible, and hydrophobic-hydrophilic (i.e., self-dispersible and forming a hazy solution when placed in water in the same manner as hand soap) and anionic, and carries acid substituents as aforesaid. The skeleton or nucleus of the emulsifying agent will be of the aliphatic type (represented by the nuclei shown in the examples which follow).

The aforesaid agents exercise their beneficial effect when present in surprisingly small amount. No more than about 3% of the agent based on the weight of the dispersion (the combined weight of the rosin and water and solvent softener when present) is needed to provide near-maximum protection, and a much smaller amount will often prove enough as a practical matter. Our laboratory investigations have indicated that the benefits imparted by the agents rise rapidly per increment of agent added until an inflection point is reached, after which the amount of protection provided by each additional increment of the agent becomes progressively less. This inflection point varies between about ½% and 1% depending on the emulsifying agent used, the percent of fortifying component in the rosin, the specific surface area of the dispersed rosin, the pH of the dispersion and the temperature of the dispersion, and the specific surface active properties of the stabilizing emulsion used. The optimum or most efficient amount of agent in any instance is therefore most conveniently found by trial.

From these and other data it appears that aqueous colloidal dispersions of rosin are most efficiently protected when the amount of the emulsifying agent is in the range of about ½% to 1.5% based on the weight of the dispersion. Valuable results, however, are achieved when the amount of emulsifying agent is on either side of this range, as the emulsifying agents of the group recited above differ substantially from each other in their protective efficiency.

The reason why the aforesaid emulsifying agents so effectively protect aqueous colloidal rosin dispersions from deterioration resulting from shear forces is not known, and applicants do not wish to be bound by any theory. However, we point out as an aid to understanding the invention, that since the emulsifying agent always contains one strongly acidic group (the sulfo group) and at least one comparatively mildly acidic group (the carboxyl group or groups), the emulsifying agent in the pH range of 2 to 6 exits predominantly as a mixed salt and free acid. We also point out that the emulsifying agent may be attached to the colloidal rosin particles because of the affinity of the long chain alkyl substituents for the hydrocarbon portion of the rosin molecules, and so may serve to cover the rosin particles with a shell of non-adhesive hydrophilic acidic substituents, and that these substituents may impart a high degree of mutual repellence to the particles. Thus while sodium dodecyl benzene sulfonate and sodium naphthalene sulfonate are ineffective for the purpose, they evidently lack the combination of properties which our defined class of emulsifying agents possess.

The rosin in the dispersion of the present invention may be of any of the natural or fortified paper-making rosins. Thus the rosin may be ordinary gum or wood rosin, or ordinary tall oil rosin, or tall oil rosin which has been heat-isomerized or disproportionated or reacted with formaldehyde to render it non-crystallizing. Such rosins generally have flow points below about 90° C.

The rosins may also be any of the foregoing rosins which have been "fortified" by reaction with compounds which increase their molecular weight and which introduce carboxy groups into the molecule. Such rosins are generally prepared by reacting the foregoing or other rosins with at least about 1/20 mol of maleic anhydride, fumaric acid, itaconic acid, citraconic acid, acetylenedicarboxylic acid, etc. About ¼ mol of the acid is usually the optimum, but up to 1 mol of the —CO—C=C— containing acid may be reacted, in which event the product is usually diluted with unreacted rosin to decrease the content of the —CO—C=C— containing rosin to the ¼ mol level.

The dispersions of the present invention have an acid pH, so that substantially all the rosin is present in free acid (i.e., unsaponified) form. Substantially no sodium rosinate is therefore present. Usually the pH of the dispersion is the autogenous pH of the colloidal rosin present. Usually this is in the range of pH 4 to 5.5. The dispersion therefore can be and generally preferably is prepared without the use of acid or base. In certain instances, however, the dispersions possess better stability at a lower pH, and dispersions having pH values as low as 1 or lower are therefore within the scope of the invention.

In the dispersions the rosin is in colloidal state, i.e., it is so finely divided that the dispersion substantially does not cream when allowed to stand.

The stabilizing emulsifying agents which are present in the dispersions of the present invention can be prepared by known methods. Thus suitable agents can be prepared by reacting a suitable alkyl maleate (e.g., sodium octadecyl maleate) or a N-alkyl maleamate (e.g., sodium N-dodecylmaleamate) as intermediate with sodium bisulfite. The alkyl substituent need not be directly esterified with the maleate, and thus there may be employed as starting material a maleate which has been esterified with an ethylene oxide adduct of a suitable alkanol, for example, the adduct of four mols of ethylene oxide with one mol of 1-decanol. The maleamic acid employed may carry one or more N-carboxy substituents, as disclosed in U.S. Pat. No. 2,438,092. Suitable agents are commercially available.

The aforesaid intermediates are in such hydrophilic-hydrophobic balance that after reaction with sodium bisulfite they are at least colloidally soluble in water.

In the specification and claims the terms "dispersion" and "emulsion" are respectively used in their customary sense to designate a dispersion of particles (which may be solid or liquid) in a liquid medium. Moreover, the terms "sulfo" and "carboxy" are employed to designate respectively the —SO₃H and —COOH substituents, as well as the alkali metal salts thereof.

The invention is more particularly illustrated by the examples which follow. These examples are preferred embodiments of the invention and are not to be construed in limitation thereof.

DESCRIPTION OF THE PREFERRED EMBODIMENTS

EXAMPLE 1

The following illustrates the comparative mechanical stabilities of typical acidic paper-sizing rosin dispersions which contain a water-dispersible anionic hydrophobic-hydrophilic emulsifying agent of the invention. The following also illustrates the comparative mechanical stabilities of such rosin dispersions which contain emulsifying agents which are outside this group.

The rosin used is a commercial paper-making unsaponified fortified rosin (hereinafter termed "rosin") having a reacted content of about ¼ mol of fumaric acid and about 1/5 mol of formaldehyde, prepared according to U.S. Pat. No. 3,400,117.

A stock anionic colloidal dispersion of this rosin is formed by dissolving 2 kg. of the rosin in 2 kg. of toluene, pouring the solution into 4 liters of water at room temperature containing 20 g. of sodium naphthalenesulfonate (1.0% on the weight of the rosin and 0.5% on the combined weight of the rosin and the toluene) and 10 g. of potassium hydroxide with vigorous agitation thereby forming a crude emulsion, and passing the emulsion twice through a homogenizer at about room temperature. The product is a white creamy emulsion having a pH of 5.5 which does not separate or form two layers on standing and which is of easily pumpable viscosity. Under the microscope the particles are seen to display Brownian movement, and at least 98% have a diameter of 1.4μ or less. When subjected to steam distillation at atmospheric pressure the dispersion aggregates. The solvent is removed without aggregation by vacuum distillation at a temperature <70° C. The final solids content is adjusted to 35% total solids content by addition of water.

Samples of this emulsion are then treated with 1% based on the weight of the rosin of the surfactants as shown in the table below. All dispersions are adjusted to 35% total solids content by addition of water.

The comparative mechanical stability of each emulsion is then obtained by placing 200 g. of emulsion at a temperature between 20° C. and 25° C. in a Waring blendor, running the blendor at maximum speed, and noting the time which elapses before the emulsion breaks (i.e., coagulates). The agitation causes the emulsion to heat, and the temperature of the emulsion at the break point is noted, which provides an indication of the thermal stability of the emulsion under high shear conditions.

A control run is performed without addition of any stabilizing agent.

The high-temperature stability of the emulsion is determined by the boil test, wherein a loosely stoppered vial of the emulsion is immersed in boiling water for one hour. The sample is rated "O.K." if it is unchanged, and "N.G." if it aggregates or had started to aggregate.

Results are as follows.

| | | Stability | | |
|---|---|---|---|---|
| | | Blender Test | | |
| Stabilizing Emulsifier Added* | | Mins. to Break | Max. Temp. °C. | Boil Test |
| Desig. | Name | | | |
| — | [Control | 4.9 | 43 | N.G.] |
| A | Tetrasodium N-(1,2-dicarboxyethyl)-N-octadecylsulfosuccinamate | 18.6 | 74 | O.K. |
| B | Disodium N-octadecylsulfosuccinamate | 16.2 | 70 | O.K. |
| C | Disodium dodecylpenta(ethoxy)-ethyl sulfosuccinate | 14.2 | 62 | O.K. |
| D | Disodium decylsulfosuccinate | 11.6 | 56 | O.K. |
| 1. | Sodium dicyclohexylsulfosuccinate | 6.1 | 44 | N.G. |
| 2. | Sodium dibutylsulfosuccinate | 5.5 | 41 | N.G. |
| 3. | Sodium diamylsulfosuccinate | 5.7 | 43 | N.G. |
| 4. | Sodium dihexylsulfosuccinate | 5.4 | 41 | N.G. |
| 5. | Sodium dioctylsulfosuccinate | 3.3 | 35 | N.G. |
| 6. | Sodium ditridecylsulfo- | 4.8 | 42 | N.G. |

| | | Stability | | |
|---|---|---|---|---|
| | | Blender Test | | |
| Stabilizing Emulsifer Added* | | Mins. to | Max. Temp. | Boil |
| Desig. | Name | Break | ° C. | Test |
| | succinate | | | |

*All emulsions contain 1.0% sodium naphthalenesulfonate and 0.5% potassium hydroxide on weight of rosin. Additional surfactants added at 1.0% on weight of rosin.

Dispersions 1-6 inclusive are unsatisfactory in that the colloidal particles in the dispersion aggregate when the dispersion is subjected to intense agitation or high temperature after the softening agent has been removed. These dispersions have about the same break point and boil test values as the control dispersion, and so represent no improvement.

EXAMPLE 2

The following illustrates the effect of varying the amount of the stabilizing emulsifier in the dispersion.

The procedure of Example 1 is repeated except that tetrasodium N-(1,2-dicarboxyethyl)-N-octadecylsulfosuccinamate is the stabilizing emulsifier used and the amount thereof is varied as shown in the table below. Results are as follows.

| | % Emulsifier Added | Stability | | |
|---|---|---|---|---|
| | | Blender Test | | |
| Run No. | | Min. to Break | Max. Temp. ° C. | Boil Test |
| — | None | 4.9 | 44 | N.G. |
| 1 | 0.25 | 8.2 | 54 | N.G. |
| 2 | 0.50 | 17.5 | 75 | O.K. |
| 3 | 0.75 | 17.9 | 76 | O.K. |
| 4 | 1.0 | 18.6 | 77 | O.K. |
| 5 | 1.5 | 21.0 | 82 | O.K. |

A sample of the dispersion of run 4 at 35% rosin content by weight is tested for its mechanical stability as follows.

A 400 cc. sample of the dispersion is supplied to a laboratory centrifugal pump running at 3200 r.p.m. pumping at the rate of 1500 cc. per minute. The discharge from the pump is vented into a catch pan elevated four feet above the pump where it is cooled to 20° C., from which it flows by gravity back to the pumps, so that it is continuously circulated.

The dispersion is unchanged after eight hours of circulation in this manner, showing that the dispersion is almost indefinitely stable.

The procedure is repeated with a similar dispersion in which the emulsifying and stabilizing component is 2% by weight of the sodium salt of the rosin component in the dispersion. The dispersion breaks down and becomes useless in less than 2 hours.

EXAMPLE 3

The procedure of Example 1 is repeated except that the sodium naphthalenesulfonate and potassium hydroxide are omitted and the stabilizing agent of Example 2 is employed in lieu thereof. Substantially the same results are obtained as in Example 2, showing that the omitted components are not necessary to provide stability of the dispersion.

EXAMPLE 4

The procedure of Example 1 is repeated except that the sodium naphthalenesulfonate and potassium hydroxide are omitted and that these materials are replaced by 3 g. of sodium hydroxide. Substantially the same results are obtained as in Example 1.

EXAMPLE 5

The following illustrates the preparation of a dispersion according to the present invention by a process wherein the rosin is a high melting point rosin but which does not contain any softening agent.

The rosin used is the rosin of Example 1.

The apparatus used is a standard laboratory autoclave fitted with a high-speed stirrer, electrical heating, and a valved discharge line which runs to a heated high-pressure closed homogenizer discharging through a water-cooled pressure reducing valve.

Into the autoclave is discharged 590 g. of the fortified rosin of Example 1 (containing no solvent or other softening agent), 7.5 g. of tetrasodium N-(1,2-dicarboxyethyl)-N-octadecylsulfosuccinamate, and 1124 g. of water. The autoclave is sealed, heated to 180° C., and the stirrer is run at top speed for three minutes. The crude emulsion thus formed is then discharged under autogenous pressure and at autogenous pH (about 5) into the homogenizer which is heated to 160° C. After homogenization the dispersion is discharged through the chilled reducing valve and is a white acidic dispersion of pumpable viscosity. It is substantially the same as the product of Example 1.

EXAMPLE 6

The following illustrates the preparation of an emulsion from which the solvent may be removed by atmospheric pressure steam distillation.

1000 g. of the rosin of Example 1 is dissolved in 667 g. of toluene. This solution is poured into 1667 g. of water containing 10 g. of tetrasodium N-(1,2-dicarboxyethyl)-N-octadecylsulfosuccinamate with vigorous agitation. The resulting crude emulsion is passed twice through a homogenizer at room temperature and the resulting white emulsion is stripped of solvent by direct steam sparging at atmospheric pressure.

The product has substantially the same stability as the product of Example 1.

We claim:

1. A rosin dispersion consisting essentially of colloidal particles of a paper-sizing rosin as dispersed phase in an acidic aqueous medium as continuous phase, said medium having a small but effective dissolved content of a water-dispersible hydrophobic-hydrophilic emulsifying agent selected from the group consisting of tetrasodium N-(1,2-dicarboxyethyl)-N-octadecylsulfosuccinamate, disodium N-octadecylsulfosuccinamate, disodium dodecylpenta(ethoxy)ethyl sulfosuccinate, and disodium decylsulfosuccinate as agent improving the mechanical stability of said dispersion, the hydrophilic-hydrophobic balance being such that said agent is at least colloidally soluble in water, and the amount of said aqueous medium being such that the dispersion is of pumpable viscosity.

2. A dispersion according to claim 1 wherein the agent is tetrasodium N-(1,2-dicarboxyethyl)-N-octadecylsulfosuccinamate.

3. A dispersion according to claim 1 wherein the agent is disodium N-octadecylsulfosuccinamate.

4. A dispersion according to claim 1 wherein the agent is sodium dodecylpenta(ethoxy)ethylsulfosuccinate.

5. A dispersion according to claim 1 wherein the agent is disodium decylsulfosuccinate.

* * * * *